F. B. ALLEN.
TRANSMISSION GEAR.
APPLICATION FILED DEC. 23, 1908.
972,143.
Patented Oct. 11, 1910.
3 SHEETS—SHEET 3.
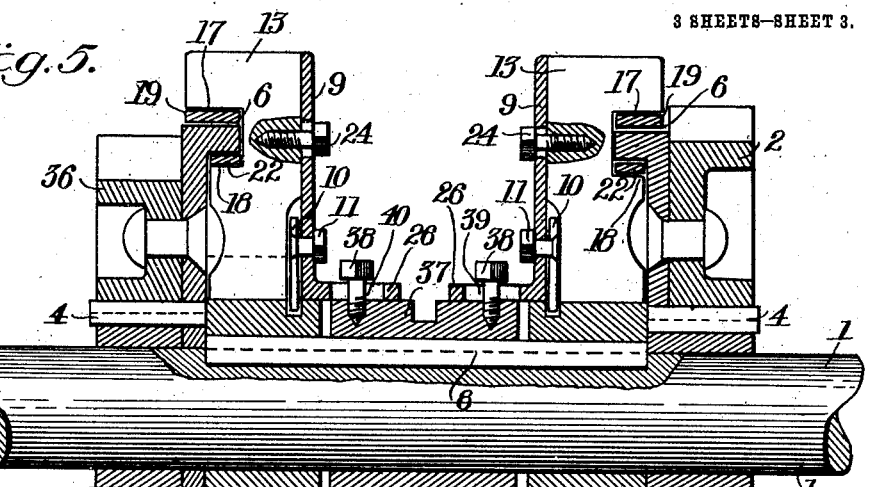
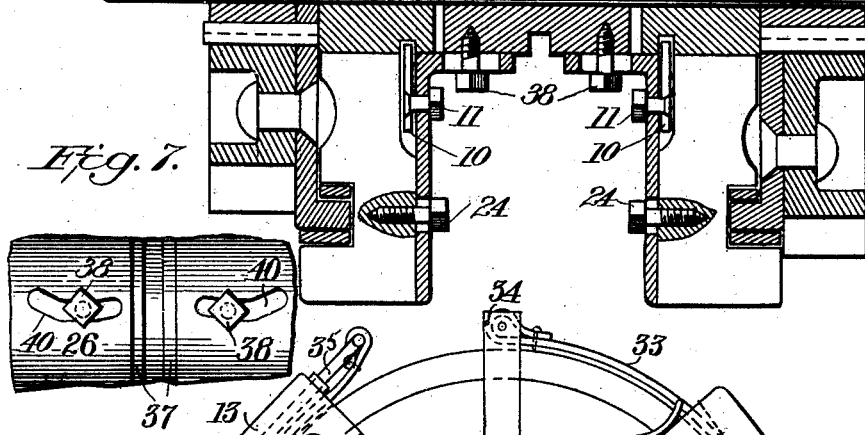
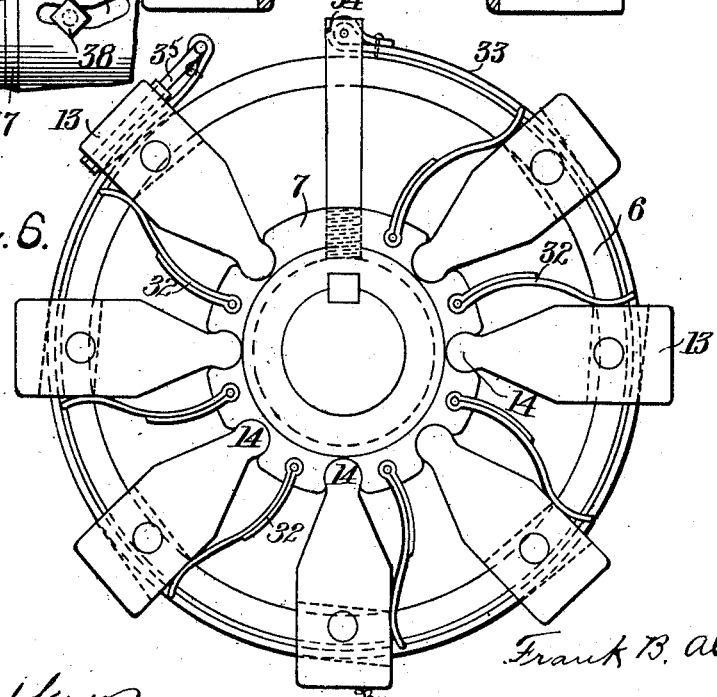
Witnesses
Inventor
Frank B. Allen
By Sturtevant & Mason
Attorneys

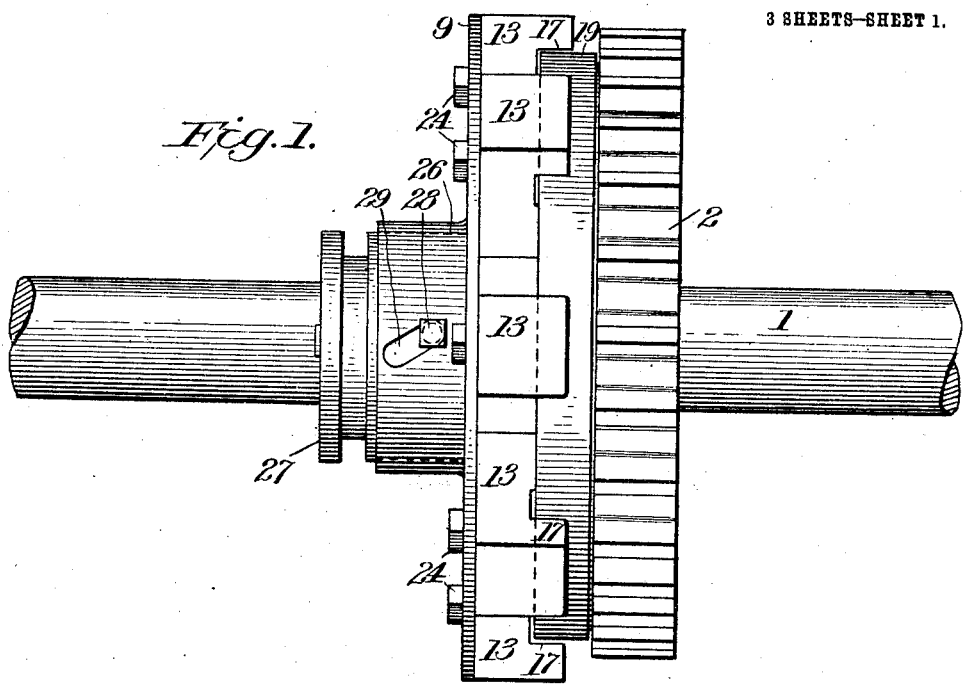
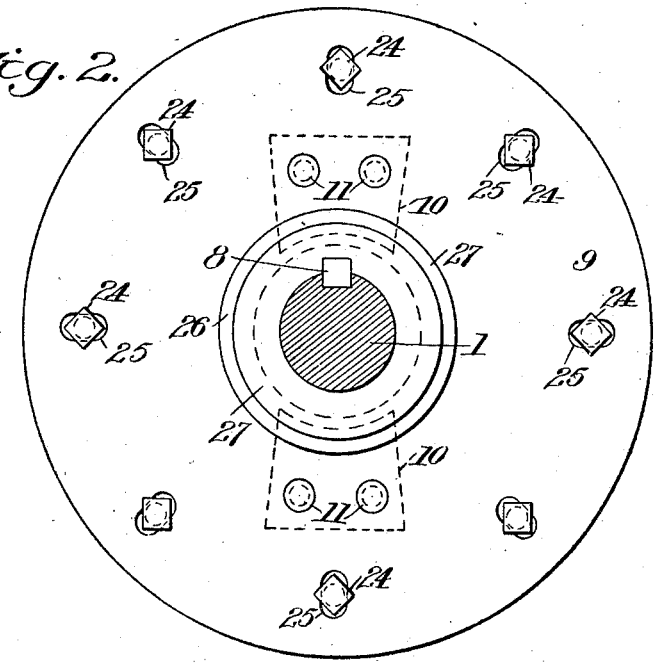

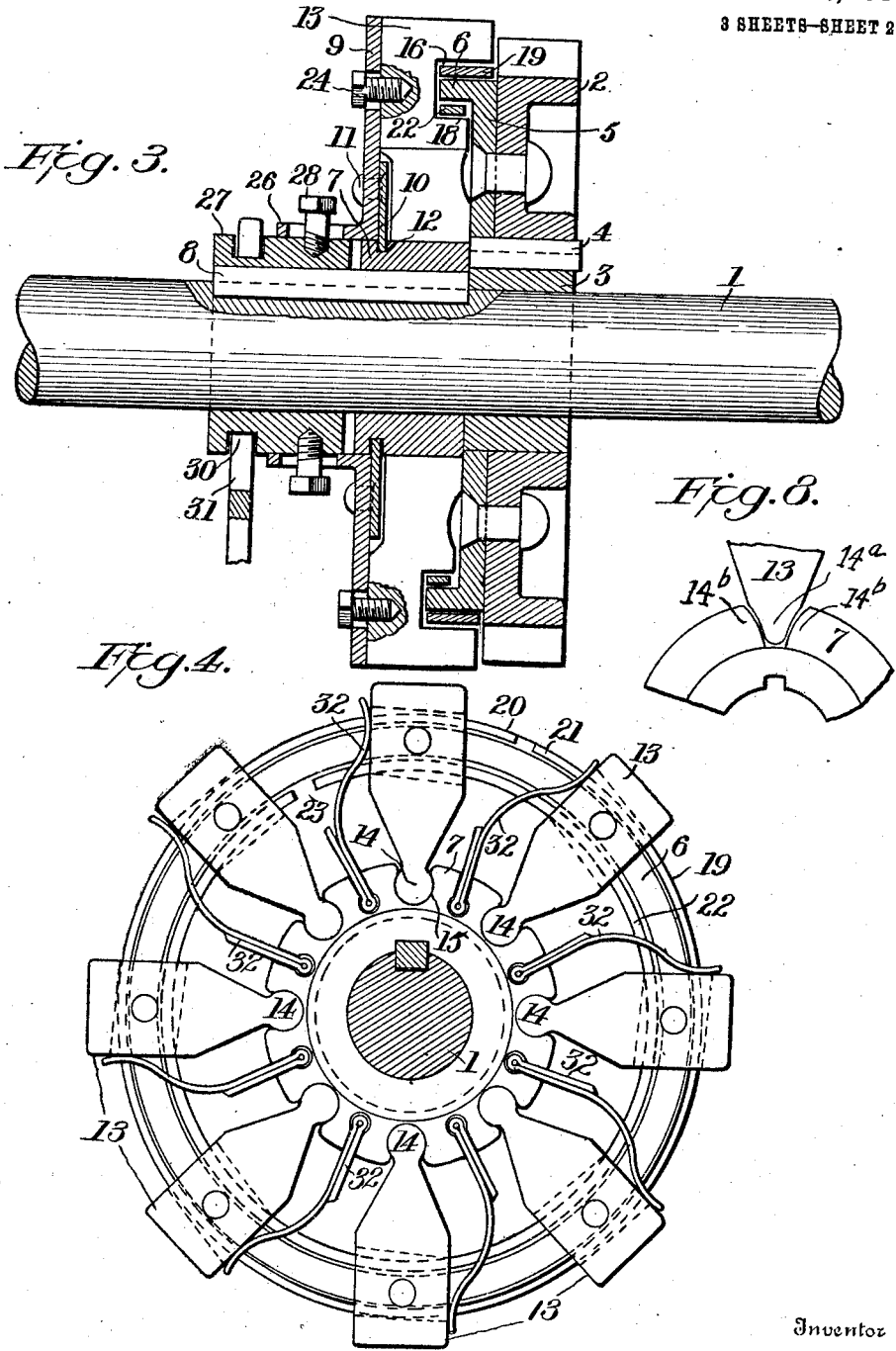

UNITED STATES PATENT OFFICE.

FRANK B. ALLEN, OF SALT LAKE CITY, UTAH.

TRANSMISSION-GEAR.

972,143.  Specification of Letters Patent.  Patented Oct. 11, 1910.

Application filed December 23, 1908. Serial No. 469,023.

*To all whom it may concern:*

Be it known that I, FRANK B. ALLEN, a citizen of the United States, residing at Salt Lake City, in the county of Salt Lake, State of Utah, have invented certain new and useful Improvements in Transmission-Gears, of which the following is a description, reference being had to the accompanying drawing and to the letters and figures of reference marked thereon.

The invention relates to new and useful improvements in transmission gears for conveying motion from one element to another.

The object of the invention is to provide a transmission gear which shall be simple in construction and positive in operation.

A further object of the invention, is to provide a transmission gear which includes shiftable clutch members which may be simultaneously operated to cause a gradual gripping action between the driven and driving members.

A further object of the invention is to provide a transmission gear having shiftable clutch members with an intermediate contact member between the clutch members and the part being gripped, whereby a gradual gripping action may be provided between the driven and the driving members.

These and other objects will in part be obvious, and will in part be hereinafter more fully described.

In the drawings which show by way of illustration one embodiment of the invention: Figure 1 is a side view showing a shaft together with my transmission gear. Fig. 2 is a side elevation of the transmission gear, the shaft being shown in section. Fig. 3 is a longitudinal sectional view through the transmission gear, with a part of the shaft broken away to show the splined connection. Fig. 4 is an end view with the shifting sleeve and the supporting plate for the clutch members, removed. Fig. 5 is a sectional view of a slightly modified form, showing two transmission gears operated by a common sleeve. Fig. 6 is a view similar to Fig. 4, showing a modified form of my invention. Fig. 7 is a detail view showing the shape of the cam slots in the double transmission gear. Fig. 8 is modified form of connection between hub and clutch member.

In the drawings, I have shown a shaft 1 which it is desired to detachably connect with a member 2. The shaft 1 may be either a driving or a driven member, and the member 2 would of course, be either the driven or driving member. The member 2 is herein shown in the form of a gear, although it may be obviously seen that any other suitable driving or driven means may be substituted for that herein shown.

The essential features of the invention consist in the means for connecting the driving member to the driven member. With the above understanding of the scope of the invention, the member 2 will be referred to herein as a gear. The gear 2 as herein shown, is keyed to a bushing 3 by means of a suitable key 4. The bushing 3 is free to turn on the shaft 1. The gear wheel 2, is provided with a disk 5, which carries a projecting ring 6.

A hub 7 is keyed to the shaft 1, by means of a suitable key 8, so that said hub rotates with the shaft 1. A plate or disk 9 freely engages the hub 7, and is locked thereto by means of an arm 10 which is secured to the disk 9 by suitable screws 11, and projects radially into a groove 12 formed in the hub 7. The arm 10 therefore, connects the disk 9 to the hub, so that said disk cannot shift laterally but is permitted to oscillate freely about the hub 7.

As a means for connecting the hub 7, which is keyed to the shaft 1, to the gear 2, I have provided a series of clutch members 13. Said clutch members are similar in construction and it will therefore be sufficient to describe in detail one of these members. The clutch member 13 is provided at its inner end with a bearing head 14, which engages a similar shaped socket 15 in the hub 7. While I have shown herein the head 14 of the clutch member 13 as cylindrical with a narrow neck between the cylindrical portion thereof and the body of the clutch member, it will be obvious that the shape of this head and also the shape of the socket which receives the same, may be varied in any desired manner, the essential feature being the socketed connection between the clutch member and the hub, so that the body of the clutch member may swing about said socketed connection as an axis.

The clutch member 13 is provided with a recess 16 which forms the clutching jaws 17 and 18. The projecting ring 6 of the plate 5, extends into said recess 16, and lies between the clutching jaws 17, 18. A friction ring 19 which may be of spring material is split so that its ends 20 and 21 are slightly separated. A similar ring 22 is also split as at 23.

It will readily be seen that if the clutch members 13 are swung in the proper direction, the jaws 17 and 18 bind against the spring rings 16, 22, and in turn crowd the rings 16, 22 against the projecting ring 6 on the plate 5. Each of the clutch members 13 are connected to the disk 9 by means of suitable pivot bolts 24. Said pivot bolts 24 extend through radial slots 25 in the disk 9, which allows a slight radial movement of the clutch members 13. While I have shown the clutch member 13 as connected to the disk 19 by a pivoted bolt located directly opposite the clutch ring on the gear 2, it is obvious that said pivot bolt might be located in any other desired position, the essential feature being that the clutch members shall in some way be operatively connected to the disk 9 so that as the disk 9 is oscillated the clutch member will swing about its connection with the hub 7.

As a means for oscillating the disk 9 to swing the clutch members, I have provided said disk 9 with an outwardly projecting sleeve 26 which extends over a collar 27. Said collar 27 is provided with a groove which engages the key 8, locking the hub 7 to the shaft 1. This connection between the collar 27 and the shaft 1, allows the collar 27 to slide longitudinally on the shaft, but prevents any rotating movement of the collar relative to said shaft. The collar 27 is provided with studs 28, which extend through cam slots 29 in the projecting sleeve 26 of the disk 9. The collar 27 is also provided with a circumferential groove 30, which may be engaged by a forked arm 31.

Suitable springs 32 are provided for each clutch member as herein shown and said springs normally tend to hold the clutch members 13 in an engaged position. The operation of my clutch will be obvious from the above description.

When the collar 27 is in the position shown in Fig. 3, that is, with the stud 28 intermediate the ends of the cam slot 29, the clutch members 13 are substantially in a radial position and the spring rings 19 and 22, are out of contact with the gripping ring 6. The rings 19 and 22, are so designed that when free from stress they are normally out of contact with the gripping ring 6. If the collar 27 should be slid on the shaft 1 by means of the forked arm 31 or by any other suitable mechanism, the studs 28 sliding in the cam groove 29, will rotate the disk 9 relative to the shaft 1 and the hub 7. This rotating of the disk 9 through the connecting bolts 24, will swing each of the clutch members 13 about its socketed connection, with the hub 7, and cause the jaws 17 and 18 of the clutch members 13, to grip the rings 19 and 22 and gradually force the same into contact with the gripping ring 6, carried by the gear 2. The rings 19 and 22 will first lightly contact with the friction ring 6 and cause an engagement of the parts, so that motion will be transmitted from the driving member to the driven member. As the jaws are tightened by a further shifting of the collar 27, the spring rings are brought into full contact with the transmitting ring 6 and the motion of the driven part will be accelerated until both the driving and driven members are moving together in the same manner as if the members 19 and 22 were not interposed between the jaws of the gripping members, and the transmitting or friction ring 6. This interposing of the spring rings allows the gradual clamping action between the driving and the driven parts, and prevents all undue wear on the jaws of the clamping members. After the spring rings have been brought firmly into contact with the transmitting ring, power is then transmitted directly from the jaws of the clamping members to the transmitting ring 6, and said jaws tighten their grip upon the transmitting ring in proportion to the amount of power transmitted. By moving the collar 27 in the opposite direction to the position shown in Fig. 3, the gripping jaws will be moved out of contact with the spring rings and the spring rings through their own elasticity, will release the transmitting gripping ring 6. If the shaft be rotated in the reverse direction, then the collar 27 should be moved in an opposite direction, and the stud 28 will rotate the disks 9 in the opposite direction and the jaws 17 and 18 of the gripping members 13 will grip the rings 19 and 22, so as to cause a positive clutching connection for the reverse drive.

In Fig. 6, I have shown in place of the spring rings of Figs. 1 to 4 inclusive, a band 33 which is secured at one end to a post 34, screwed into the hub 7 and at its other end to a threaded bolt 35, which is adjustably connected to one of the gripping members 13. Said friction band 33 lies between the jaw 17 of the gripping members 13, and the friction or transmitting ring 6 of the gear. Said band 33 serves the purpose of the spring rings above described.

In Fig. 5, I have shown in addition to the transmitting gear 2, a transmitting gear 36, which as herein shown is smaller in diameter than the transmitting gear 2. The transmitting connection between the gears 2 and 36 and the shaft 1, is merely a duplicate of the transmitting mechanism above described. These transmitting mechanisms however, are so disposed upon the shaft 1 that they may be operated by a common sliding collar 37. This collar 37 is provided with operating studs 38, 38 which engage cam grooves 40 and 40 formed in the projecting sleeves 26 of the disk 9. As shown in Fig. 7, these cam grooves are provided with a straight portion leading into a cam or angular portion. The straight portion of the slot is sufficiently long so that the collar 37 may be shifted to the left and the stud 38 will be moving in the straight portion of the slot 39 when the stud 38 is moving in the cam portion of the slot 40 and vice versa. It will be readily seen that by shifting the collar 37 to the right or left, the gear 2 or the gear 36 may be locked to the shaft 31.

In Fig. 8 I have shown the connection between the hub 7 and the clutch member 13, shaped as two intermeshing gear teeth. When the clutch members swing to clutching position, the members 14$^a$ and 14$^b$ will swing and slide on each other in the same manner as two gears. The member 14$^a$ can of course, withdraw sufficiently from the member 14$^b$, as to allow the clutch member 5 to grip the gripping ring without any binding of the parts.

Having thus particularly described my invention, what I claim as new and desire to secure by Letters Patent, is:—

1. The combination of a driven member, a transmitting ring carried by said driven member and projecting laterally therefrom, a driving member, a hub splined to said driving member and rotating therewith, clutch members having clutching faces located on opposite sides of said ring, and having a swinging connection with said hub, a disk provided with means for engaging said clutch members, said disk being mounted to rotate freely on said hub, and means for rotating said disk to cause the clutch members to clutch the transmitting ring.

2. The combination of a driven member, a transmitting ring carried by said driven member and projecting laterally therefrom, a driving member, a hub splined to said driving member and rotating therewith, clutch members having clutching faces located on opposite sides of said ring and having a swinging connection with said hub, a friction member located between the transmitting ring and the clutching faces of the clutch members, a disk provided with means for engaging said clutch members, said disk being mounted to rotate freely on said hub, and means for rotating said disk to cause the clutch members to clutch the transmitting ring.

3. The combination of a driven member, a transmitting ring carried by said driven member and projecting laterally therefrom, a driving member, a hub mounted on said driving member, clutch members having clutching faces located on opposite sides of said ring, and having a pivotal connection with said hub, a friction member located between said transmitting ring and the clutching faces of the clutch members, a disk to which said clutch members are pivoted, mounted to rotate freely on said hub, and means for oscillating said disk to cause the clutching members to clutch the transmitting ring.

4. The combination of a driven member, a transmitting ring carried by said driven member and projecting laterally therefrom, a driving member, a hub mounted on said driving member, clutch members having clutching faces located on opposite sides of said ring and having a pivotal connection with said hub, a friction member located between said transmitting ring and the faces of the clutch members, a disk to which said clutch members are pivoted mounted to rotate freely on said hub, a collar movable with said hub, and means operated by a sliding movement of the collar for oscillating said disk to cause the clutch members to clutch the transmitting ring.

5. The combination of a shaft, a gear mounted to rotate on said shaft, a transmitting ring carried by said gear, a hub mounted on said shaft and rotating therewith, clutch members having clutching faces located on opposite sides of said ring, and having heads pivotally connected to said hub, a disk, to which said clutch members are pivoted, mounted to rotate freely on said hub, means for preventing longitudinal movement of said disk, a collar carried by said shaft, and rotating therewith, and means operated by a sliding movement of said collar for oscillating said disk, to cause the clutch members to clutch the transmitting ring.

6. The combination of a shaft, a gear mounted to rotate on said shaft, a transmitting ring carried by said gear, a hub mounted on said shaft and rotating therewith, clutch members having clutching faces located on opposite sides of said ring, a friction member located between one of the clutching faces of said clutch members and said transmitting ring, a disk to which said clutch members are pivoted, mounted to rotate freely on said hub, a collar carried by said shaft and rotating therewith, and means operated by a sliding movement of said collar, for oscillating said disks to cause the clutch members to clutch the transmitting ring.

7. The combination of a shaft, a gear loosely mounted on said shaft, a transmitting ring carried by said gear, a hub keyed to said shaft, clutch members having a pivotal connection with said hub, and having clutching faces located on opposite sides of said ring, a split ring located between one of the clutching faces of said clutch members, and said transmitting ring, a disk to which said clutch members are connected, means for connecting said disk to said hub, whereby the same may rotate relative thereto, and is prevented from longitudinal movement, a sleeve carried by said disk and having a cam slot therein, a collar splined to said shaft and having studs engaging the cam slots in said sleeve.

8. The combination of a shaft, a gear mounted to rotate freely thereon, a transmitting ring carried by said gear and projecting laterally therefrom, a hub mounted on said shaft and rotating therewith, members coöperating with said transmitting ring and located normally radially relative to said shaft, said clutch members having pivotal connection with said hub, a friction member located between one of the clutching faces of said clutch members and said transmitting ring, a spring for holding each of said clutch members normally in a radial position, a disk mounted to rotate on said hub, means for connecting said disk with said clutch members, and means for oscillating said disk for causing the clutch members to clutch the transmitting ring.

9. The combination of a shaft, a gear mounted to rotate freely thereon, a transmitting ring carried by said gear and projecting laterally therefrom, a hub mounted on said shaft and rotating therewith, clutch members coöperating with said transmitting ring and located normally radially relative to said shaft, said clutch members having pivotal connection with said hub, a friction member located between one of the clutching faces of said clutch members and said transmitting ring, a spring for holding each of said clutch members normally in a radial position, a disk mounted to rotate on said hub, means for connecting said disk with said clutch members, a collar carried by said shaft and rotating therewith, and means operated by the sliding movement of said collar oscillating said disk to cause the clutch member to clutch the transmitting ring.

In testimony whereof I affix my signature, in presence of two witnesses.

FRANK B. ALLEN.

Witnesses:
EPHRAIM T. OBLOD,
HENRY V. VAN PELT.